United States Patent
Lin et al.

(10) Patent No.: US 8,073,264 B2
(45) Date of Patent: Dec. 6, 2011

(54) IMAGE-BASED TECHNIQUES FOR SHREDDED DOCUMENT RECONSTRUCTION

(75) Inventors: Huei-Yung Lin, Chia-Yi (TW); Wen-Cheng Fan Chiang, Taoyuan County (TW)

(73) Assignee: National Chung Cheng University, Chia-Yi (TW)

( * ) Notice: Subject to any disclaimer, the term of this patent is extended or adjusted under 35 U.S.C. 154(b) by 271 days.

(21) Appl. No.: 12/588,866

(22) Filed: Oct. 30, 2009

(65) Prior Publication Data

US 2010/0310115 A1 Dec. 9, 2010

(30) Foreign Application Priority Data

Jun. 3, 2009 (TW) .............................. 98118465 A

(51) Int. Cl.
*G06K 9/00* (2006.01)
(52) U.S. Cl. ......... 382/224; 382/100; 382/164; 382/171
(58) Field of Classification Search .................. 382/100, 382/164, 171, 224, 284
See application file for complete search history.

(56) References Cited

U.S. PATENT DOCUMENTS

| | | | | |
|---|---|---|---|---|
| 6,779,747 | B2 * | 8/2004 | McLean et al. | 241/30 |
| 7,099,522 | B2 * | 8/2006 | Anderson et al. | 382/287 |
| 7,456,983 | B2 * | 11/2008 | Meador et al. | 358/1.14 |
| 2003/0231800 | A1 * | 12/2003 | Anderson et al. | 382/254 |
| 2004/0205662 | A1 * | 10/2004 | Anderson et al. | 715/530 |

* cited by examiner

*Primary Examiner* — Stephen Koziol
(74) *Attorney, Agent, or Firm* — Bacon & Thomas, PLLC

(57) ABSTRACT

An image-based technique for shredded document reconstruction includes the steps of: employing an image processing process to obtain shred images of the shredded document, and then extracting several features of shred images for reconstruction with two similarity measures, and then employing an algorithm using the shred coding scheme and average word length that is insensitive to the shredding noise on image boundaries, and then a weighted digraph is then carried out to derive the optimal shred sorting result for document reconstruction in terms of the shortest path. Experiments are presented for both the synthetic and real data sets. The results show that the proposed method has correctly merged the majority of the shredded document.

14 Claims, 3 Drawing Sheets

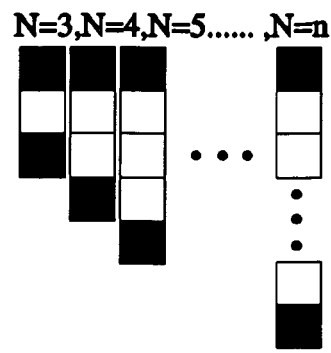
FIG.2
Image Process
Base Line
FIG.3
 where an edge between
indicate the length of
FIG.4

IMAGE-BASED TECHNIQUES FOR SHREDDED DOCUMENT RECONSTRUCTION

BACKGROUND OF THE INVENTION

1. Field of the Invention

The present invention relates to shredded document reconstruction technology and more particularly, to image-based techniques for shredded document reconstruction.

2. Description of the Related Art

In order to protect secrets of paper documents, paper documents will be destroyed. Except the method of burning paper documents into ash, the best way is to cut paper documents into shreds with a shredder. Under certain demand, such as forensics and investigation sciences, shredded document reconstruction is necessary.

Currently, shredded document reconstruction is performed by assembling a big number of shreds of shredded document by labor by means of jigsaw puzzle techniques. It is natural that assembling shreds to reconstruct the document is a time-consuming task.

Further, there are other shredded document reconstruction techniques to measure the similarity between any two shreds. Most of them measure the similarity by comparing the pixels between shreds. The information of continuity of the gray-scale of cut grafting is usually employed for fine shred matching. However, when the text is too small, different characters may be shown on two shreds of the same cut after removal of boundary noise. Therefore, simply comparing pixels for matching is not reasonable and may result in errors.

SUMMARY OF THE INVENTION

The present invention has been accomplished under the circumstances in view. It is the main object of the present invention to provide an image-based technique for shredded document reconstruction, which achieves shredded document reconstruction by using image pattern characteristics for matching and sorting.

It is another object of the present invention to provide an image-based technique for shredded document reconstruction, which establishes correlation between pairs of shreds by means of graph theoryconcept for quick matching and sorting, thereby achieving quick shredded document reconstruction.

To achieve these and other objects of the present invention, an image-based technique for shredded document reconstruction comprises the steps of: a) Image processing where shred images for reconstruction are acquired by scanning the shredded document, and then the image of the shred in each shred image is discriminated from the image of the background, and then the non-text region of white background color and the text region of black text block are separated by segmenting the histogram obtained from the horizontal projection of each shred image; b) Special Shred Selection where the shred images are classified, so that the blank shreds, the leftmost shreds containing the text part of the original document, and the rightmost shreds containing the text part of the original document are selected; c) Shred Coding where the base-lines of the text lines of the shred images are united into a group, and then the midpoint coordinates of the projection histogram of the base-lines of one same text line is served as the vertical coordinates of the respective text lines, and then a shred model is created from all of the shred images by uniting the vertical coordinates of the text lines, and then a binary coding is followed for the individual shreds so that each shred image has a corresponding shred code; d) Similarity Measure where a predetermined algorithm is employed to calculate the binary codes of the shreds, thereby obtaining a correlation score for the binary code of each of the shreds; and e) Sorting Scheme where the shred images are sorted based on a graph architecture by using multiple vertices to represent the binary codes of the shreds and multiple edges to represent the correlation scores between the pairs of the shred images and then employing a contraction operation on the vertices and the edges; thereafter a first stage sorting is employed by: sorting the order of the shred images, which order being the order of different shred codes; thereafter, a secondary stage sorting is employed on the shred images having one same shred code to get the order of the shred images having one same shred code; thereafter the first stage sorting result and the second stage sorting result are combined together to obtain a complete image, achieving shredded document reconstruction.

BRIEF DESCRIPTION OF THE DRAWINGS

FIG. 2 is a schematic drawing of the present invention, showing a morphological structure of elements.

FIG. 3 is a schematic drawing of the present invention, showing the location of the base line of a text line.

FIG. 4 is a histogram obtained from the horizontal projection of shred images according to the present invention.

DETAILED DESCRIPTION OF THE INVENTION

Other and further advantages, benefits and features of the present invention will be fully understood by reference to the following specification in conjunction with the accompanying drawings.

Figure 1:
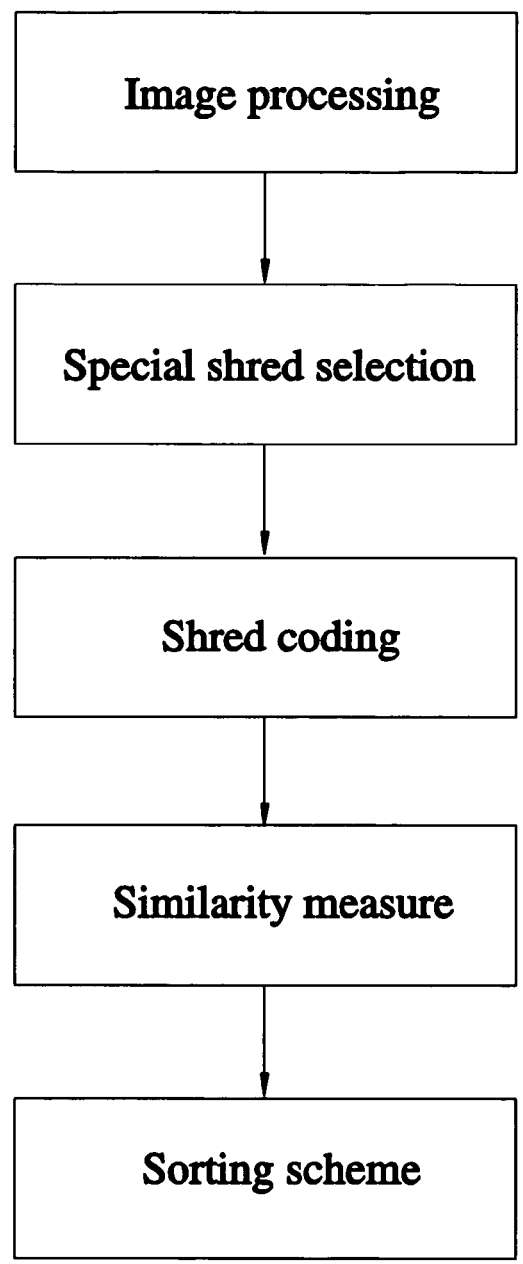
FIG. 1 is a flow chart of an image-based technique for shredded document reconstruction in accordance with the preferred embodiment of the present invention.

Referring to the figures and in particular to FIG. 1, an image-based technique for shredded document reconstruction in accordance with the preferred embodiment of the present invention is adapted for reconstruction of shredded document by means of an image processing process. The image-based technique for shredded document reconstruction includes the steps of:

a) Image Acquisition and Pre-processing

Shred images for reconstruction are acquired by scanning the shredded document placed on a blue background, followed by object segmentation and length normalization in the shredding direction to reduce image processing time and complexity in subsequence stages. Although some texture details might be lost during the normalization process, the computational complexity for pattern matching in the subsequent stages is greatly reduced. To remove the saw-tooth shape noise on the boundaries caused by the paper shredder and the shading caused by scanning, a one-dimensional morphological erosion is carried out in the horizontal direction (i.e. orthogonal to the shredding direction). Finally, the resulting shred images are binarized and the image features are extracted for document reconstruction. One of the important prerequisites for correct pattern matching between the shred images is to align the text lines across all available pieces. This text and non-text region separation is achieved by segmenting the histogram obtained from the horizontal projection of each shred image. Furthermore, the local maxima of the horizontal projection histogram are used to identify the top-lines and base-lines of the text lines. According to the present invention, the morphological tool used is a one-dimensional structural device of size "n" that is determined subject to actual situation. The definition of this one-dimensional structural device is shown in FIG. 2 in which the pixel at the top side is the origin, the pixel at the bottom side is the neighbor of the structural device, and the area between the origin and the neighbor is the white pixel(s); when the pixel of the origin is a pixel of a black text pattern and the pixel of the neighbor is also a pixel of a black text pattern, the white pixel(s) of the structural device is (are) filled up with a pixel of a black text pattern or pixels of black text patterns. Thereafter, obtain the location of the vertical coordinates of the base-line of the image text line (i.e., the base-line of the English character "x"). FIG. 3 illustrates the location of the base-line of the text line of the document. At final, obtain the histogram of the horizontal projection of each shred image. FIG. 4 illustrates the histogram of the horizontal protection of the text lines of two shred images.

b) Special Shred Selection

For a general shredded document, there usually exist three types of special pieces, which are different from the majority of the shreds. They are namely the blank (or all-white) shreds, the leftmost shreds containing the text part of the original document, and the rightmost shreds containing the text part of the original document. The text line range of each shred is defined by means of using the histogram of vertical projection of the respective shred image. Thus, a leftmost shred, rightmost shred or blank shred is determined subject to the black text pixels on the left cut and right cut of each shred. If the number of black text pixels on the left cut of the shred image of one shred and that on the right cut are below a predetermined threshold, the shred is judged to be a blank shred. If only the number of black text pixels on the left cut is below the predetermined threshold, the shred is judged to be the leftmost shred. If only the number of black text pixels on the right cut is below the predetermined threshold, the shred is judged to be the rightmost shred.

c) Shred Coding

Figure 5:
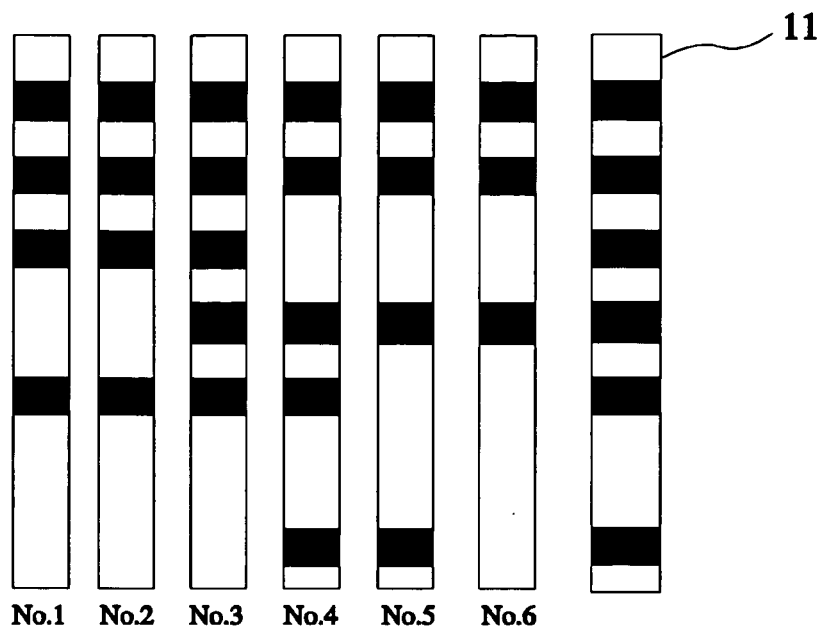
FIG. 5 is a schematic drawing of the present invention, showing a shred model obtained from all of the shred images.

From the histogram of horizontal projections, each shred image consists of a number of text blocks separated by several disconnected blank blocks. If we compare this binary pattern with the one generated from the original document image, it can be seen that the test blocks of any individual shred is a subset of those in the original document. Furthermore, there might be different text block patterns for different shred images mainly due to the large space introduced by the beginning or ending of a text line. For the shreds with high spatial proximity, however, those patterns can be identical or only differ by a few text blocks. Based on the above observation, a shred coding scheme is proposed to group the closely related shreds. The ideal is to assign similar binary coded patterns to the shreds based on their spatial proximity. This grouping method can significantly reduce the computational complexity, especially for document reconstruction from a large number of shred images. The algorithm consists of first creating a shred model 11 from all of the shred images, followed by binary coding for the individual shreds. The binary coding for each shred is accomplished by comparing its text block or base-line locations with the shred model. Since the text block pattern of an individual shred is merely a subset of the shred model, a "o" or "1" will be assigned depending on whether the text block of a shred is absent or present on the model. FIG. 5 illustrates the shred model 11.

d) Similarity Measure

Figure 6:
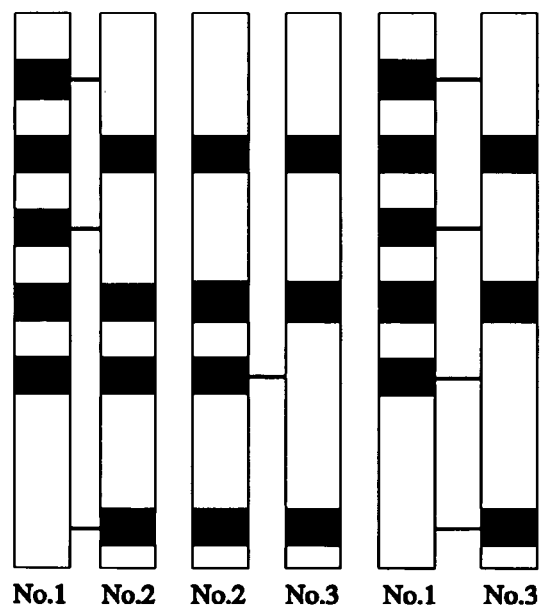
FIG. 6 is a schematic drawing of the present invention, showing negative correlations assigned to bit differences among shred binary codes.

In shredded document reconstruction, a similarity measure is employed to evaluate the similarity between any two shreds. The similarity measure can be: to use the discrepancy in the shred coding result. The shred coding pattern described can be thought of as a simplified representation of the document layout. Based on the continuity characteristic of the document content, a negative correlation is assigned to each bit difference between the binary codes. Consequently, there is a negative correlation score between any pair of shreds, which serves as one of the similarity measures for sorting shreds to the correct order in the original document. FIG. 6 illustrates an example of comparison between each two shreds of the shreds from No. 1 through No. 3, in which the negative correlation score between No. 1 shred and No. 2 shred is 3; the negative correlation score between No. 2 shred and No. 3 shred is 1; the negative correlation score between No. 1 shred and No. 3 shred is 4. Alternatively, the similarity measure can be: to calculate the correlation between the shreds based on the average word length. Under the assumption that the length of each word in a document should be as close to the average word length as possible, a negative correlation score can be evaluated using the difference. Although the word lengths are not constant in a document, this similarity measure is valid for a general probability distribution of word length, especially with a large sample size.

e) Sorting Scheme

Sort the unorganized shred images based on the graph architecture. Use multiple vertices to represent the binary codes of the shreds and multiple edges to represent the correlation scores between the pairs of the shred images. These vertices and edges constitute a graph architecture. Perform a first stage sorting by: finding out the vertex of the shred image of left-white and right-text to be the start and then sorting the order of the vertices subject to the order of the correlation scores from big to small. This order is the order of different shred codes. Thereafter, perform a secondary stage sorting on the shred images having the same shred code. The secondary stage sorting focuses on finding the shortest path of the digraph associated with the supernode derived from shred coding. Except for the supernodes containing the border shreds, the starting and ending vertices in the same binary coded set are not available. One simple way to obtain the shortest path is to compute the cost function or the similarity metric exclusively for all possible permutations of the shred images. In this work, the shortest path is generated sequentially by identifying the two adjacent vertices connected by the directed edge with the highest weight in the same coded group. Although the link between any two vertices is bipartite, merging the adjacent vertices using the highest weighted edge will simultaneously remove the possibility of path finding using the other merge. Continue this process of merging the adjacent vertices, the edges for the shortest path is identified and the digraph is shrunk to a single vertex corresponding to the supernode of the coded group. The first stage sorting result and the second stage sorting result are combined together, achieving complete sorting of all shred images and obtaining reconstruction of shredded document.

Subject to the aforesaid steps, shredded document is reconstructed based on an image processing technique. In short, the image-based technique for shredded document reconstruction of the present invention is to obtain shred images of the shreds by means of an image processing process, and then to discriminate the white background color of every shred image from the black text block for horizontal projection so as to obtain projection histogram, and then to perform shred coding and correlation calculation on the shred images subject to the projection histogram, and finally to sort the shred images subject to the correlation calculation result and to combine the shred images subject to the sorting result.

As stated above, several features (i.e., the features of white background color and black text block) of shred images of shreds are extracted for reconstruction with two similarity measures. The proposed algorithm using the shred coding scheme and average word length is insensitive to the shredding noise on image boundaries. A weighted digraph is then carried out to derive the optimal shred sorting result for document reconstruction in terms of the shortest path. Experiments are presented for both the synthetic and real data sets. The results show that the proposed method has correctly merged the majority of the shredded document.

What is claimed is:

1. An image-based technique for shredded document reconstruction, comprising the steps of:
   a) Image processing where shred images for reconstruction are acquired by scanning the shredded document, and then the image of the shred in each shred image is discriminated from the image of the background, and then the non-text region of white background color and the text region of black text block are separated by segmenting the histogram obtained from the horizontal projection of each shred image;
   b) Special Shred Selection where the shred images are classified, so that the blank shreds, the leftmost shreds containing the text part of the original document, and the rightmost shreds containing the text part of the original document are selected;
   c) Shred Coding where the base-lines of the text lines of the shred images are united into a group, and then the midpoint coordinates of the projection histogram of the base-lines of one same text line is served as the vertical coordinates of the respective text line, and then a shred model is created from all of the shred images by uniting the vertical coordinates of the text lines, and then a binary coding is followed for the individual shreds so that each shred image has a corresponding shred code;
   d) Similarity Measure where a predetermined algorithm is employed to calculate the binary codes of the shreds, thereby obtaining a correlation score for the binary code of each of the shreds; and
   e) Sorting Scheme where the shred images are sorted based on a graph architecture by using multiple vertices to represent the binary codes of the shreds and multiple edges to represent the correlation scores between the pairs of the shred images and then employing a contraction operation on the vertices and the edges; thereafter a first stage sorting is employed by: sorting the order of the shred images, which order being the order of different shred codes; thereafter, a secondary stage sorting is employed on the shred images having one same shred code to get the order of the shred images having one same shred code; thereafter the first stage sorting result and the second stage sorting result are combined together to obtain a complete image, achieving shredded document reconstruction.

2. The image-based technique for shredded document reconstruction as claimed in claim 1, wherein object segmentation and length normalization in the shredding direction are employed to reduce image processing time and complexity in subsequence stages after the shred images are obtained in step a).

3. The image-based technique for shredded document reconstruction as claimed in claim 1, wherein a color segmentation technique is employed in step a) to discriminate the image of the shred from the image of the background in each of the shred images and the white background color from the black text in the image of the shred in each of the shred images.

4. The image-based technique for shredded document reconstruction as claimed in claim 1, wherein after application of the color segmentation technique in step a) to discriminate the image of the shred from the image of the background in each of the shred images and the white background color from the black text in the image of the shred in each of the shred images, a one-dimensional morphological erosion is carried out in the horizontal direction (i.e. orthogonal to the shredding direction) is employed to remove the saw-tooth shape noise on the boundaries caused by the paper shredder and the shading caused by scanning.

5. The image-based technique for shredded document reconstruction as claimed in claim 1, wherein horizontal projection is employed on each of the shred images, and the pixel number of the black text pattern of each horizontal projection is separately calculated so as to obtain the projection histogram of the text region and projection histogram of the non-text region of each of the shred images.

6. The image-based technique for shredded document reconstruction as claimed in claim 5, wherein after obtained the projection histogram of the text region and projection histogram of the non-text region of each of the shred images in step a), the location of the vertical coordinates of the base-line of the image text line (i.e., the base-line of the English character "x") is obtained, and finally the histogram of the horizontal projection of each of the shred images is obtained.

7. The image-based technique for shredded document reconstruction as claimed in claim 1, wherein in step b) selecting the blank shreds, the leftmost shreds containing the text part of the original document and the rightmost shreds containing the text part of the original document is done by means of defining the text line range of each shred by means of using the histogram of vertical projection of the respective shred image so that a leftmost shred, rightmost shred or blank shred is determined subject to the black text pixels on the left cut and right cut of each shred. If the number of black text pixels on the left cut of the shred image of one shred and that on the right cut are below a predetermined threshold, the shred is judged to be a blank shred; the shred is judged to be the leftmost shred when only the number of black text pixels on the left cut is below the predetermined threshold; the shred is judged to be the rightmost shred when only the number of black text pixels on the right cut is below the predetermined threshold.

8. The image-based technique for shredded document reconstruction as claimed in claim 1, wherein in step c) the binary coding for each shred is accomplished by assigning a "o" or "1" depending on whether the text block of each of the shreds is absent or present on the model.

9. The image-based technique for shredded document reconstruction as claimed in claim 1, wherein in step c) a morphological tool of a one-dimensional structural device is used to group the closely related shreds by assigning similar binary coded patterns to the shreds based on their spatial proximity, assuring the connected blocks in the projection histogram to be of the same text line.

10. The image-based technique for shredded document reconstruction as claimed in claim 1, wherein in step d), the predetermined algorithm is to compare each two binary codes in the shred model so that a negative correlation is assigned to each bit difference between the binary codes, and consequently a negative correlation score between any pair of shreds is obtained.

11. The image-based technique for shredded document reconstruction as claimed in claim 1, wherein in step d), the predetermined algorithm is to calculate the correlation between the shreds based on the average word length under the assumption that the length of each word in a document should be as close to the average word length as possible, a negative correlation score is evaluated using the difference.

12. The image-based technique for shredded document reconstruction as claimed in claim 1, wherein in step e), the first stage sorting is performed by: finding out the vertex of the shred image of left-white and right-text to be the start and then sorting the order of the vertices subject to the order of the correlation scores from big to small.

13. The image-based technique for shredded document reconstruction as claimed in claim 1, wherein in step e), the secondary stage sorting on the shred images having the same shred code focuses on finding the shortest path of the digraph associated with the supernode derived from shred coding; to obtain the shortest path is to compute the cost function or the similarity metric exclusively for all possible permutations of the shred images; the shortest path is generated sequentially by identifying the two adjacent vertices connected by the directed edge with the highest weight in the same coded group.

14. The image-based technique for shredded document reconstruction as claimed in claim 13, wherein the process of merging the adjacent vertices is continued so that the edges for the shortest path is identified and the digraph is shrunk to a single vertex corresponding to the supernode of the coded group.

* * * * *